United States Patent
Wong et al.

(10) Patent No.: US 11,190,509 B2
(45) Date of Patent: Nov. 30, 2021

(54) AUTHENTICATION THROUGH EXCEPTION HANDLING

(71) Applicant: salesforce.com, inc., San Francisco, CA (US)

(72) Inventors: Matthew Wong, Castro Valley, CA (US); Alan Vangpat, Pittsburgh, PA (US); Sean Tubbs, San Francisco, CA (US); Sarah Lui, San Mateo, CA (US); William C. Mortimore, Jr., San Francisco, CA (US); Itzik Koren, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 222 days.

(21) Appl. No.: 15/960,321

(22) Filed: Apr. 23, 2018

(65) Prior Publication Data

US 2019/0327230 A1 Oct. 24, 2019

(51) Int. Cl.
*H04L 29/06* (2006.01)
*G06F 21/62* (2013.01)

(52) U.S. Cl.
CPC ........ *H04L 63/0884* (2013.01); *G06F 21/629* (2013.01); *H04L 2463/082* (2013.01)

(58) Field of Classification Search
CPC ........ G06F 21/604; G06F 21/32; G06F 21/31; G06F 2221/2119; G06F 2221/2149;

(Continued)

(56) References Cited

U.S. PATENT DOCUMENTS 7,194,744 B2 3/2007 Srivastava et al.
8,095,972 B1 * 1/2012 Floyd .................. G06F 16/9574
726/9

(Continued)

OTHER PUBLICATIONS

International Search Report and Written Opinion in application No. PCT/US2019026731 dated Jun. 18, 2019, 16 pages.

(Continued)

*Primary Examiner* — Chau Le
*Assistant Examiner* — Andrew Suh
(74) *Attorney, Agent, or Firm* — Kowert, Hood, Munyon, Rankin & Goetzel, P.C.

(57) ABSTRACT

Techniques are disclosed relating to user authentication. In some embodiments, a computing system maintains an exception handler of a software development platform. The exception handler is executable to process a particular type of exception that causes an authentication of users of applications running on the software development platform. The computing system may receive, at the exception handler, an indication of the particular type of exception thrown by a particular application. In response to receiving the indication of the particular type of exception, the exception handler issues to a web browser interacting with the application, a request that the web browser redirect to an authentication server configured to perform an authentication of a user of the particular application. The computing system receives, from the authentication server, a result of the performed authentication and returns the result to the particular application.

19 Claims, 5 Drawing Sheets

(58) Field of Classification Search
CPC .. G06F 21/33; G06F 2221/2141; G06F 16/95; G06F 21/305; G06F 21/572; G06F 2221/033; G06F 21/629; H04L 63/0884; H04L 2463/082; H04L 63/0815; H04L 63/08; H04W 12/06
See application file for complete search history.

(56) References Cited

U.S. PATENT DOCUMENTS

| | | | | |
|---|---|---|---|---|
| 8,312,523 | B2* | 11/2012 | Geller | G06F 21/31 |
| | | | | 726/8 |
| 8,769,626 | B2 | 7/2014 | Gundavelli et al. | |
| 8,793,509 | B1 | 7/2014 | Nelson et al. | |
| 8,856,954 | B1* | 10/2014 | Hathaway | G06F 21/31 |
| | | | | 726/28 |
| 8,990,916 | B2 | 3/2015 | Pazhyannur et al. | |
| 2004/0117803 | A1* | 6/2004 | Srivastava | G06F 9/3861 |
| | | | | 719/318 |
| 2004/0210771 | A1* | 10/2004 | Wood | G06F 21/31 |
| | | | | 726/8 |
| 2006/0282897 | A1* | 12/2006 | Sima | G06F 11/3664 |
| | | | | 726/25 |
| 2009/0228704 | A1* | 9/2009 | de Atley | G06F 8/20 |
| | | | | 713/156 |
| 2011/0179469 | A1 | 7/2011 | Blinn | |
| 2012/0131683 | A1* | 5/2012 | Nassar | H04L 63/08 |
| | | | | 726/28 |
| 2012/0144374 | A1 | 6/2012 | Gallagher | |
| 2012/0290959 | A1* | 11/2012 | Quine | G06F 8/34 |
| | | | | 715/765 |
| 2012/0310914 | A1* | 12/2012 | Khan | G06F 16/951 |
| | | | | 707/710 |
| 2014/0082715 | A1* | 3/2014 | Grajek | G06F 16/955 |
| | | | | 726/8 |
| 2016/0219026 | A1 | 7/2016 | Gangadharan et al. | |
| 2017/0003960 | A1* | 1/2017 | Subramanian | G06F 8/76 |
| 2017/0170963 | A1 | 6/2017 | Hong | |
| 2018/0075231 | A1 | 3/2018 | Subramanian | |
| 2019/0005211 | A1* | 1/2019 | Sekiya | G06F 21/12 |

OTHER PUBLICATIONS

International Preliminary Report on Patentability in Appl. No. PCT/US2019/026731 dated Jul. 7, 2020, 10 pages.

* cited by examiner

FIG. 1

*Developer*
*Code*
*113A*

```
...
trigger gpaTrigger on Student__c (before update)  {
    Map<String, String> sessionMap = auth.SesionManagement.getCurrentSession();
    If (!sessionMap.get('SessionSecurityLevel").equals("HIGH_ASSURANCE'))  {
        throw new Auth.VerificationException(Auth.VerificationPolicy.HIGH_ASSURANCE,
            'Updating GPA');
    }
}
...
```

*Thrower*
*114*

*Exception Indication 202*

*Policy Indication 204*

*Action Indication 206*

AUTHENTICATION THROUGH EXCEPTION HANDLING

BACKGROUND

Technical Field

This disclosure relates generally to computer security, and, more specifically, to user authentication.

Description of the Related Art

A computer network may include multiple resources that are shared among several users potentially wanting to access the resources. In order to ensure a given user does not abuse a resource, a user may be authenticated before being given access to a resource. In some instances, a given resource may handle the authentication locally—e.g., by asking for authentication information and comparing it against locally stored authentication for authorized users. In other instances, a computer network may rely on a trusted centralized authority to maintain authentication information and authenticate users. A centralized authority can be advantageous as it may be easier to maintain and afford greater protection of user authentication information. Examples of authentication schemes that use a central authority include Kerberos, remote authentication dial-in user service (RADIUS), etc.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "authentication server configured to perform an authentication of a user" is intended to cover, for example, a computer system having a processor and memory having program instructions executable to perform this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to initial two created user accounts, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some instances, a developer may want to authenticate a user before enabling requested functionality of an application. If the authentication is being handled by an authentication server, the developer may be responsible for writing code in the application that redirects a user to the authentication server as well as code that handles returning the user to the application in order to be given access to the requested functionality. Writing this code, however, may be tedious and could be implemented incorrectly.

The present disclosure describes embodiments in which a platform may host one or more applications on an application server that is accessible to client devices via a web browser. As will be described in greater detail below in various embodiments, the platform supports a new type of exception that can be thrown by an application to cause user authentication to be performed. As used herein, the term "exception" is to be interpreted according to its understood meaning in the art, which includes a data structure that 1) is returned in response to occurrence of an event (such as the occurrence of an error), and that 2) includes information about the event usable by an exception handler to take an action associated with the occurrence of the event. In various embodiments, when the particular type of exception is thrown, an exception handler provided by the platform receives an indication of the thrown exception and facilitates redirecting a user's web browser to an authentication server configured to authenticate the user. In some embodiments, the exception handler also facilitates returning the user's browser to the application after authentication is performed—e.g., by causing the browser to replay the earlier request that caused the particular type of exception to be initially thrown.

In various embodiments, an application developer wanting to authenticate a user at a particular location in an application can merely write an instruction to throw the particular type of exception and use the exception handler provided by the platform to facilitate the user authentication. In many instances, being able to handle authentication via throwing an exception can simplify a developer's task of writing application code—and potentially encourage greater application development.

Figure 1:
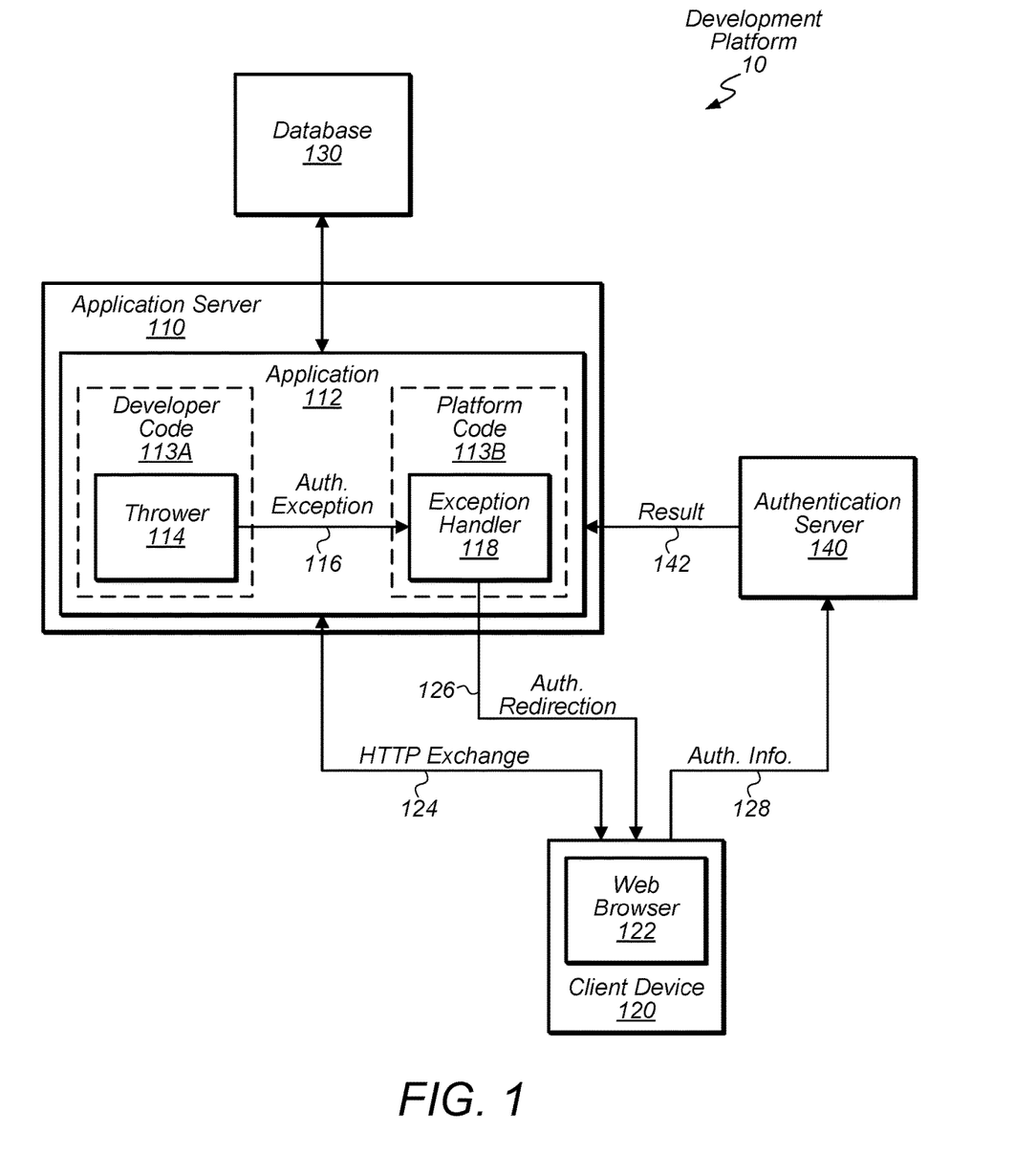
FIG. 1 is a block diagram of one embodiment of a development platform supporting user authentication through exception handling.

Turning now to FIG. 1, a block diagram of a development platform 10 supporting user authentication through exception handling is depicted. In the illustrated embodiment, platform 10 includes an application server 110, client device 120, database 130, and an authentication server 140. Application server 110 includes an application 112, which includes a thrower 114 and an exception handler 118. Client device 120 includes a web browser 122. In some embodiments, platform 10 may be implemented differently than shown—e.g., client device 120 may not be a part of platform 10; servers 110, 130, and/or 140 may be implemented by the same computer system; database 130 may not be present; etc.

Development platform 10, in various embodiments, provides various services including the hosting of applications, such as application 112, on an application server 110, which may be accessible to one or more client devices 120 via a web browser 122. In some embodiments, application server 110 is one of multiple computing systems working together as a computer cluster in order for platform 10 to implement a cloud. In some embodiments, platform 10 provides a database 130, which may be accessible to applications for storing application data. In some embodiments, platform 10 may provide services for facilitating development of applications such as application 112. For example, these services may include providing a user interface to receive program instructions from a developer, providing libraries having program instructions that can be incorporated by into an application, facilitating compilation of developer code, etc.

Application 112 may correspond to any suitable application in which user authentication is desired. Accordingly, in one embodiment, application 112 is executable to facilitate customer relationship management (CRM). As shown, application 112 may include developer code 113A and platform code 113B. Developer code 113A is program instructions written by a developer of application 112. In contrast, platform code 113B is program instructions supplied by platform 10 and may be included in application 112 via, for example, an incorporation of a library, an application programmable interface (API) reference, extending a base class, etc.

As noted above, a developer may want to authenticate a user at one or more locations in application 112. For example, web browser 122 may be participating in a hyper-text transport protocol (HTTP) exchange 124 with application 112 in which a user is presented with a user interface web page of the application. As a user interacts with application 112, browser 122 may request access to confidential information (e.g., via an HTTP GET request), request to update important information (e.g., via HTTP POST request), request performance of a particular function in application 112, etc. Rather than provide program instructions in developer code 113A to handle user authentication during these circumstances, in various embodiments, a developer can include a program instruction (shown as thrower 114) to trigger the user authentication.

Thrower 114, in the illustrated embodiment, is a program instruction (or program instructions) executable to throw a particular type of exception (shown as authentication exception 116) that causes user authentication in response to determining that web browser 122 has requested an action that warrants the authentication. In various embodiments, authentication exception 116 may include (or be accompanied with) various information usable to facilitate further processing of exception 116. Accordingly, in some embodiments, this information may identify the particular type of exception in order to distinguish it from other types. This information may also include information about the context in which exception 116 such as identifying the particular action being requested, whether it was associated with an HTTP GET request or HTTP POST request, etc. In some embodiments, exception 116 also includes (or is accompanied with) a stack trace identifying the call stack (i.e., the particular sequence of called functions) associated with the function that threw exception 116. For example, the stack trace might indicate that a function "main" called a function "foo", which called a function "bar" that threw exception 116 (i.e., included thrower 114). In some embodiments, authentication exception 116 may also identify a particular authentication policy, which may identify a threshold hold security level for a user, identify the manner in which the user should be authenticated, etc. As will be discussed below, this information may be used to determine whether redirection to server 140 is warranted, how to replay a request that triggered exception 116, etc. An example of developer code including a thrower 114 is discussed below in greater detail with respect to FIG. 2. Once authentication exception 116 has been throw, it may propagate up the call stack until it is caught by exception handler 118.

Exception handler 118, in various embodiments, is executable to receive an indication of a thrown authentication exception 116 and process exception 116, including redirecting web browser 122 to authentication server 140 for authentication. As will be discussed below in greater detail, in some embodiments, handler 118 may initially analyze the information included with exception 116, such as the stack trace, in order to determine whether authentication is even warranted. If the authentication is warranted, in the illustrated embodiment, exception handler 118 issues a request to redirect web browser 122 (shown as authentication redirection 126) to interface authentication server 140. In some embodiments, authentication redirection 126 is an HTTP response including a 3XX status code (such as code 303) and a new uniform resource locator (URL) directed to authentication server 140.

Authentication server 140, in the various embodiments, is a computer system configured to authenticate users of platform 10. Accordingly, server 140 may serve an authentication web page that includes one or more input fields for receiving authentication information 128 from a user. Server 140 may then compare received authentication information 128 against maintained authentication of authorized users and may indicate a result 142 to application server 110, which may convey result 142 to application 112. Authentication server 140 may support any suitable form of authentication. In some embodiments, server 140 performs a two-factor authentication in which a user may, for example, present 1) a user name and password and 2) a one-time authentication code, which may be sent to a user's phone. Once server 140 has performed the authentication, web browser 122 may be redirect back to application 112.

In some embodiments, handler 118 facilitates this returning redirection by analyzing various information received with exception 316 and determining where browser 122 should return after authentication. As will be discussed in greater detail with respect to FIG. 3, in some embodiments, handler 118 includes, in authentication redirection 126, a return URL identifying the return location in application 112. In response to receiving this URL, authentication server 140 may issue a corresponding redirection to that URL after performing the authentication. In some embodiments, this approach may be used if exception 116 is thrown in response to browser 122 initially sending an HTTP GET request that specified the URL in order to cause browser 122 to replay the HTTP get request. In some embodiments, handler 118 may instead store information in database 130 and include an identifier in redirection 126 to subsequently retrieve this information to facilitate replay. In such an embodiment, authentication server 140 may redirect browser 122 to another location and include the identifier in the redirection. In such an embodiment, this other location (which is described as handler 118 below with FIG. 3, but may be another location in other embodiments) may retrieve the stored information from database 130 and redirect browser 122 to replay a HTTP request using this information. In some embodiments, this approach may be used if exception 116 is thrown in response to browser 122 initially sending an HTTP POST request specifying various parameters, which may be stored and retrieved from database 130 to cause them to be replayed in another HTTP POST request. In other embodiments, replaying the initial HTTP request may be performed differently.

Figure 2:
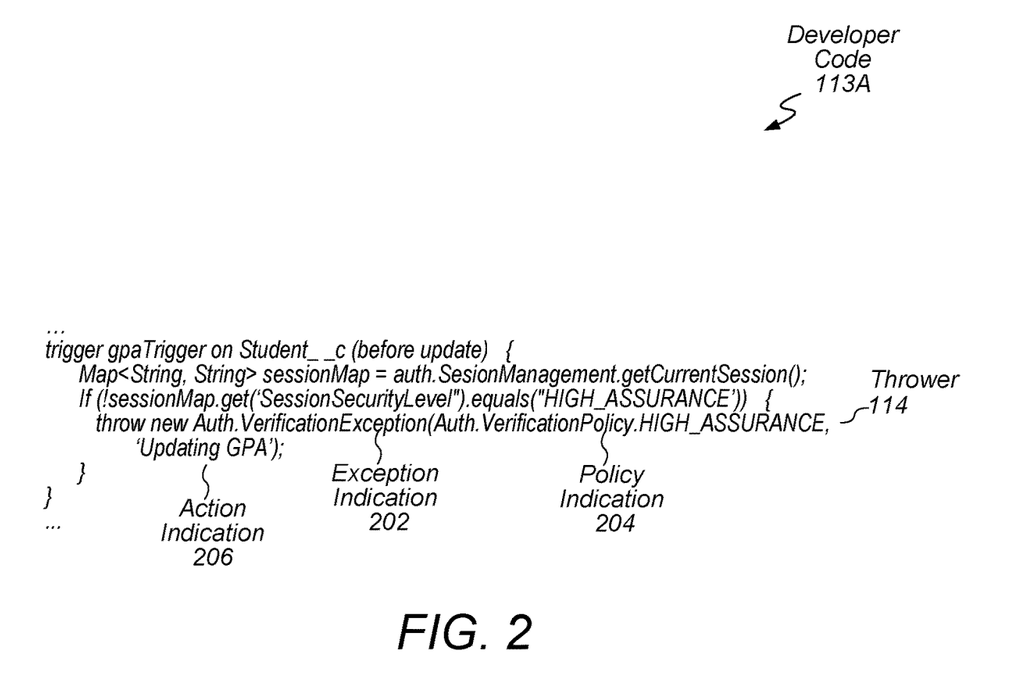
FIG. 2 is a diagram illustrating an example of developer code executable to throw an exception causing user authentication.

Turning now to FIG. 2, an example of developer code 113A including a thrower 114 is depicted. In this example, application 112 is executable to keep track of a student's grade point average (GPA). If a browser 112 has issued a request to update the student's GPA, a determination is made whether the user's authentication level is equal to "HIGH ASSURANCE" (a level assigned to a school administrator in this example). If the authentication is not equal, execution of thrower 114 occurs.

In the illustrated embodiment, thrower 114 specifies an exception indication 202, policy indication 204, and action indication 206, which may be provided to exception handler 118 when exception 116 is thrown. Exception indication 202 identifies the particular type of exception being thrown, so that it can be distinguished from other types and routed to the appropriate hander. Policy indication 204 identifies the authentication policy associated with the authentication and may be used, for example, to determine what level of authentication is desired for the requested action. Action indication 206 identifies the particular action (e.g., "updating GPA") being requested that causes the exception 116 to be thrown. In other embodiments, thrower 114 may specify more (or less) information. Although not depicted, a stack trace may be returned through invoking the "throw" operator. Notably, however, thrower 114 does not, in the illustrated embodiment, explicitly specify a particular location to send browser 122 (such as URL to authentication server 140) or explicitly specify that browser 112 has to return to a particular location.

When thrower 114 is executed, exception handler 118 may receive an indication of the thrown exception 116. In some embodiments, this indication is in the form of a pointer to the data structure, which, in this example, is instantiated by invoking the "new" operator and thrown by the "throw" operator. In another embodiment, the received indication is the data structure including information the exception 116. (Although the illustrated example is written in APEX™, any suitable language may be used.)

Figure 3:
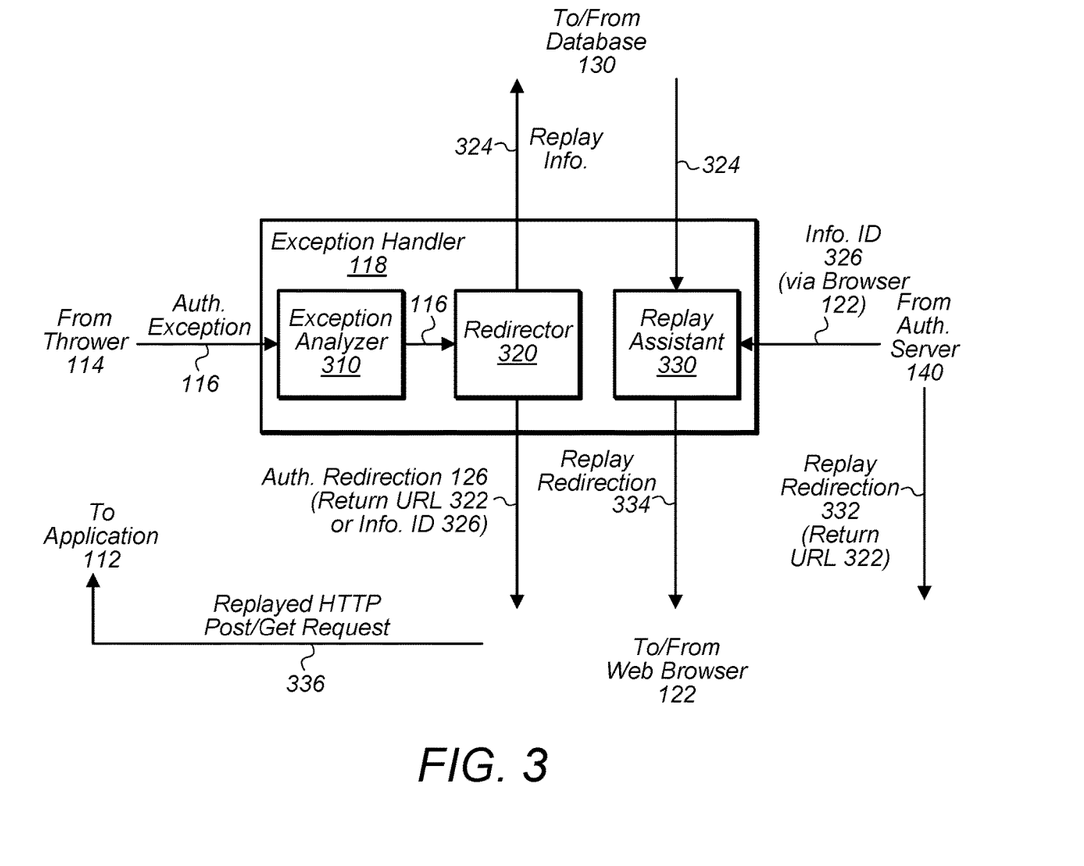
FIG. 3 is a block diagram illustrating one embodiment of an exception handler executable to process the thrown exception.

Turning now to FIG. 3, a block diagram of exception handler 118 is depicted. In the illustrated embodiment, exception handler 118 includes exception analyzer 310, redirector 320, and replay assistant 330. In some embodiments, handler 118 may be implemented different than shown—e.g., replay assistant 330 may be distinct from handler 118, located at authentication server 140, and/or located elsewhere.

Exception analyzer 310, in some embodiments, is a set of program instructions executable to analyze the information returned with exception 116 and determine whether authentication is warranted. In various embodiments, this analysis may include examining the various information discussed above with respect to FIG. 2. For example, analyzer 310 may identify the origin (e.g., function) of the thrown exception 116 based on the call stack in the stack trace. If the exception 116 originated from an application programming interface (API) call (as opposed to a function in developer code 113A), analyzer 310 may determine that authentication is not warranted. Analyzer 310 may also analyze the particular function being requested by browser 220 (e.g., action indication 206 returned with exception 116). If authentication is not warranted, analyzer 310 may return an error message to application 112 and/or browser 122. If authentication is warranted, however, analyzer 310 may pass exception 116 to redirector 320.

Redirector 320, in some embodiments, is a set of program instructions executable to redirect web browser 122 to an authentication server 140 to cause performance of a user authentication. As noted above, this redirection may include, for example, sending an HTTP redirection status code (e.g., a 3XX code) to browser 122 with the address of authentication server 140. In various embodiments, redirector 320 is also executable to collect various information usable to facilitate browser 122's return to application 112. In some embodiments, redirector 320 includes this information as one or more parameters in a URL included in authentication redirection 126. For example, if an HTTP GET request from browser 122 triggered exception 116, redirector 320 may include a return URL 322 identifying the location where browser 122 is to return upon authentication. In response to receiving return URL 322, authentication server 140 may include return URL 322 in a replay redirection 332 to cause browser 122 to return to application 112 and replay the initial HTTP GET request 336. In some embodiments, redirector 320 may alternatively store replay information 324 in database 130 and include an information identifier 326 within the URL in authentication redirection 126 in order to later retrieve information 324. For example, if an HTTP POST request from browser 122 triggered exception 116, redirector 320 may store the parameters specified in the HTTP POST request in database 130 for subsequent retrieval. In some embodiments, redirector 320 may further encrypt replay information 324 in order to protect it. (Although database 130 is depicted in FIG. 1 as separate from application server 110, any suitable storage may be used to store replay information 124 such as a local cache at server 110.)

Replay assistant 330, in some embodiments, is a set of program instructions executable to cause the web browser to return to the particular application by instructing the web browser to replay a request 336 that caused the indication of the particular type of exception to be thrown. Although depicted within handler 118 in the illustrated embodiment, assistant 330 may reside elsewhere such as within application 112, authentication server 140 (e.g., to issue replay redirection 332), etc. Multiple instances of replay assistant 330 may also be used. In the illustrated embodiment, assistant 330 receives information identifier 326 from authentication server 140 (which may be conveyed via browser 122 in a redirection request) in response to performance of an authentication. In response to receiving identifier 326, assistant 330 may use identifier 326 to retrieve earlier stored replay information 324 from database 130 and provide information 324 in a replay redirection 334 to cause browser 122 to replay the appropriate HTTP request 336 to return to application 112.

Figure 4A:
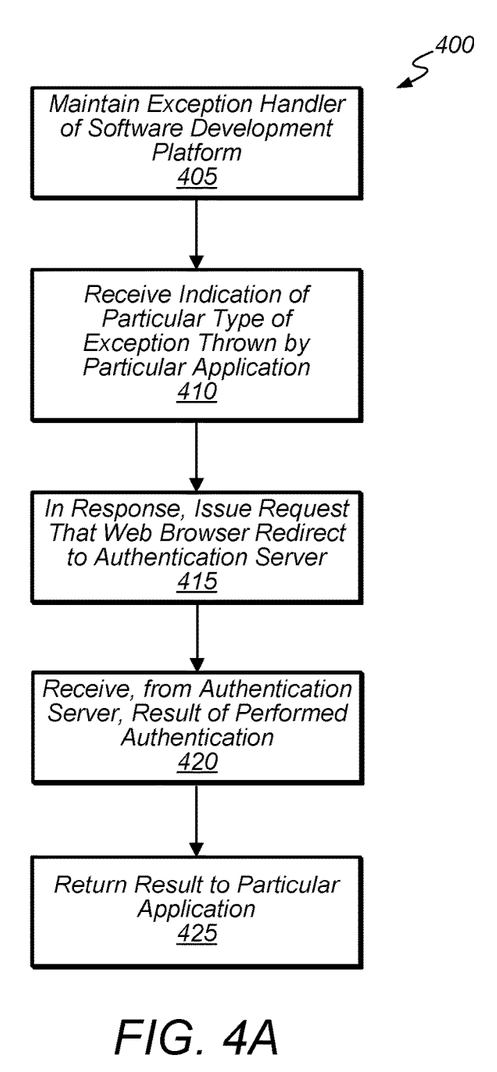
FIGS. 4A and 4B are flow diagrams illustrating embodiments of methods for authenticating through exception handling.

Turning now to FIG. 4A, a flowchart of a method 400 for authenticating a user through exception handling is depicted. In one embodiment, method 400 is performed by a computing system executing an application such as application server 110 executing application 112.

In step 405, an exception handler (e.g., handler 118) of a software development platform (e.g., platform 10) is maintained, the exception handler being executable to process a particular type of exception (e.g. exception 116) that causes an authentication of users of applications (e.g., application 112) running on the software development platform.

In step 410, an indication of the particular type of exception thrown by a particular application is received at the exception handler.

In step 415, in response to receiving the indication of the particular type of exception, the exception handler issues, to a web browser (e.g., browser 122) interacting with the particular application, a request (e.g., redirection 126) that the web browser redirect to an authentication server (e.g., server 140) configured to perform an authentication of a user of the particular application. In some embodiments, the issued request includes a hypertext transfer protocol (HTTP) redirection status code. In some embodiments, the authentication is a two-factor authentication. In some embodiments, a stack trace received with the indication of the particular type of exception is analyzed, the stack trace identifying a name of an application function that threw the particular type of exception. Based on the analyzing, a determination is made whether to issue the request that the web browser redirect to an authentication server.

In step 420, a result (e.g., result 142) of the performed authentication is received from the authentication server. In step 425, the result is returned to the particular application. In some embodiments, method 400 further includes, in response to the authentication, causing the web browser to return to the particular application by instructing the web browser (e.g., via redirection 334) to replay a request (e.g., a request 336) that caused the indication of the particular type of exception to be thrown. In some embodiments, a uniform resource locator (URL) is provided to the web browser that includes information (e.g., return URL 322 or info. identifier 326) usable to replay the request that caused the indication of the particular type of exception to be thrown. In some embodiments, method 400 includes storing, in a database, information (e.g., replay information 324) about the request that caused the indication of the particular type of exception to be thrown. In such an embodiment, the stored information is used to replay the request that caused the indication of the particular type of exception to be thrown. In some embodiments, method 400 includes determining where to cause the web browser to return in the particular application by analyzing a stack trace received with the indication of the particular type of exception, the stack trace identifying a name of an application function that threw the particular type of exception.

Figure 4B:
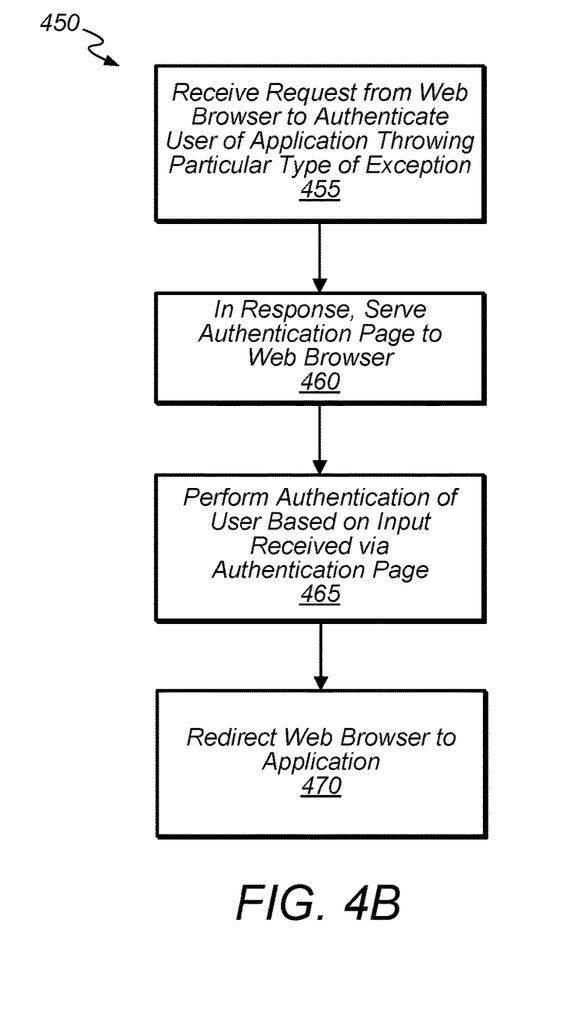

Turning now to FIG. 4B, a flowchart of another method 450 for authenticating a user through exception handling is depicted. In one embodiment, method 450 is performed by a computing system performing a user authentication such as authentication server 140.

Method begins in step 455 with receiving a request from a web browser (e.g., browser 122) to authenticate a user of an application. In various embodiments, the request is issued by the web browser in response to the application throwing a particular type of exception (e.g., exception 116) that causes an exception handler (e.g., handler 118) to redirect the web browser to the computing system. In step 460, in response to the request, an authentication page is served to the web browser. In step 465, an authentication of the user is performed based on an input (e.g., authentication information 128) received via the authentication page. In step 470, the web browser is redirected to the application (e.g., via replay redirection 332). In various embodiments, the redirecting includes providing, to the web browser, information usable by the web browser to replay a request to the application that caused the particular type of exception to be thrown. In some embodiments, the information provided to the web browser is determined based on a value (e.g., information identifier 326) included in a uniform resource locator (URL) within the received request to authenticate. In some embodiments, the replayed request is a hypertext transfer protocol (HTTP) post request (e.g., request 336) that includes one or more parameters corresponding to the provided information. In one embodiment, the value is usable to obtain the one or more parameters from a database (e.g., database 130).

Exemplary Computer System

Figure 5:
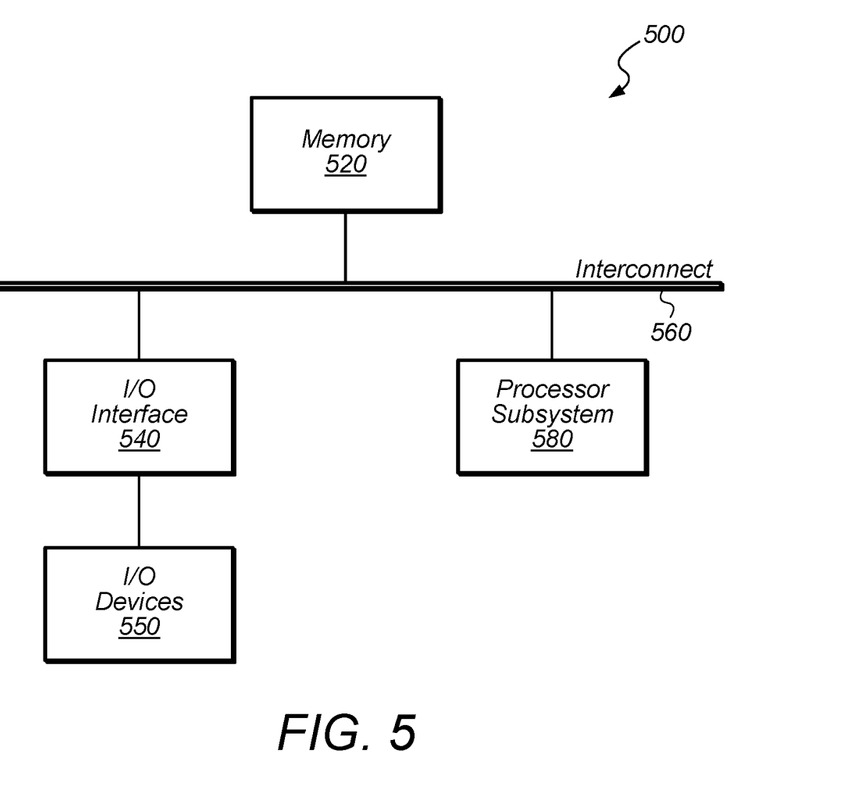
FIG. 5 is a block diagram illustrating one embodiment of an exemplary computer system.

Turning now to FIG. 5, a block diagram of an exemplary computer system 500, which may implement functionality of platform 10 (such as server 110, device 120, database 130, or server 140), is depicted. Computer system 500 includes a processor subsystem 580 that is coupled to a system memory 520 and I/O interfaces(s) 540 via an interconnect 560 (e.g., a system bus). I/O interface(s) 540 is coupled to one or more I/O devices 550. Computer system 500 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 500 is shown in FIG. 5 for convenience, system 500 may also be implemented as two or more computer systems operating together.

Processor subsystem 580 may include one or more processors or processing units. In various embodiments of computer system 500, multiple instances of processor subsystem 580 may be coupled to interconnect 560. In various embodiments, processor subsystem 580 (or each processor unit within 580) may contain a cache or other form of on-board memory. In one embodiment, processor subsystem 580 may include processor(s) 102 described above.

System memory 520 is usable store program instructions executable by processor subsystem 580 to cause system 500 perform various operations described herein. System memory 520 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 500 is not limited to primary storage such as memory 520. Rather, computer system 500 may also include other forms of storage such as cache memory in processor subsystem 580 and secondary storage on I/O Devices 550 (e.g., a hard drive, storage array, etc.). In some embodiments, these other forms of storage may also store program instructions executable by processor subsystem 580. In some embodiments, application 112 described above may program instructions stored within system memory 520.

I/O interfaces 540 may be any of various types of interfaces configured to couple to and communicate with other devices, according to various embodiments. In one embodiment, I/O interface 540 is a bridge chip (e.g., Southbridge) from a front-side to one or more back-side buses. I/O interfaces 540 may be coupled to one or more I/O devices 550 via one or more corresponding buses or other interfaces. Examples of I/O devices 550 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 500 is coupled to a network via a network interface device 550 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored therein that are capable of causing a computing system to implement operations comprising:
    maintaining a software development platform that hosts applications provided by a plurality of developers, wherein the maintaining includes presenting an interface for receiving program instructions of an application provided by a developer;
    providing, by the software development platform, an exception handler distinct from the developer-provided program instructions, wherein the exception handler is executable to process a particular type of exception that causes an authentication of users of applications running on the software development platform;
    receiving, at the exception handler, an indication of the particular type of exception thrown by a program instruction included in the application by the developer;
    in response to receiving the indication of the particular type of exception:
        analyzing, by the exception handler, a stack trace received with the indication of the particular type of exception to determine whether to issue a request to a web browser interacting with the application to redirect to an authentication server configured to perform an authentication of a user of the application;
        based on the determining, issuing, by the exception handler to the web browser, the request to cause the web browser to redirect to the authentication server;
        receiving, from the authentication server, a result of the performed authentication; and
        returning the result to the application.

2. The computer readable medium of claim 1, wherein the operations comprise:
    in response to the authentication, causing the web browser to return to the application by instructing the web browser to replay a request that caused the indication of the particular type of exception to be thrown.

3. The computer readable medium of claim 2, wherein the issuing includes:
    providing, to the web browser, a uniform resource locator (URL) that includes information usable to replay the request that caused the indication of the particular type of exception to be thrown.

4. The computer readable medium of claim 2, wherein the issuing includes:
    storing, in a database, information about the request that caused the indication of the particular type of exception to be thrown, wherein the stored information is used to replay the request that caused the indication of the particular type of exception to be thrown.

5. The computer readable medium of claim 2, wherein the operations comprise:
    determining where to cause the web browser to return in the application by analyzing the stack trace received with the indication of the particular type of exception, wherein the stack trace identifies a name of an application function that threw the particular type of exception.

6. The computer readable medium of claim 1, wherein the stack trace identifies a name of an application function that threw the particular type of exception.

7. The computer readable medium of claim 6, wherein the issued request includes a hypertext transfer protocol (HTTP) redirection status code.

8. The computer readable medium of claim 1, wherein the authentication is a two-factor authentication.

9. A non-transitory computer readable medium having program instructions stored thereon that are capable of causing a computing system to implement an application performing operations comprising:
    presenting a user interface of the application to a web browser of a client device;
    determining that the web browser has requested a function of the application that warrants a user authentication;
    throwing a particular type of exception that is handled by an exception handler provided by a software development platform operable to hosts applications provided by a plurality of developers, wherein the particular type of exception is thrown by a program instruction included in the application by a developer and causes the platform-provided exception handler to redirect the web browser to an authentication server configured to perform the user authentication;

providing, to the exception handler, a stack trace analyzed by the exception handler to determine whether to issue a request to the web browser to redirect to the authentication server; and based on a result of the performed authentication, authorizing performance of the requested function.

10. The computer readable medium of claim 9, wherein the stack trace identifies a call stack usable by the exception handler to determine whether redirection of the web browser is warranted.

11. The computer readable medium of claim 9, wherein the stack trace identifies a name of the requested function usable by the exception handler to cause the web browser to resubmit a request for the function.

12. The computer readable medium of claim 9, wherein the user authentication is based on two or more factors.

13. The computer readable medium of claim 9, wherein the program instructions include program instructions of the exception handler.

14. A method, comprising:

presenting, by a computing system, a software development platform that hosts applications provided by a plurality of developers, wherein the platform includes an interface for receiving program instructions of an application provided by a developer;

receiving, by the computing system, a request from a web browser to authenticate a user of the application, wherein the request is issued by the web browser in response to a program instruction included by the developer in the application throwing a particular type of exception that causes an exception handler provided by the platform to redirect the web browser to the computing system for authentication of the user, and wherein the request is issued responsive to the exception handler analyzing a stack trace received with the particular type of exception to determine whether to issue a request to the web browser to redirect to the computing system;

in response to the received request, serving, by the computing system, an authentication page to the web browser;

performing, by the computing system, the authentication of the user based on an input received via the authentication page; and redirecting, by the computing system, the web browser to the application.

15. The method of claim 14, wherein the redirecting of the web browser to the application includes:

providing, to the web browser, information usable by the web browser to replay a request to the application that caused the particular type of exception to be thrown.

16. The method of claim 15, further comprising:

determining, by the computing system, the information to provide to the web browser based on a value included in a uniform resource locator (URL) within the received request to authenticate.

17. The method of claim 16, wherein the replayed request is a hypertext transfer protocol (HTTP) post request that includes one or more parameters corresponding to the provided information.

18. The method of claim 17, wherein the value is usable to obtain the one or more parameters from a database.

19. The method of claim 15, wherein the authentication is based on two or more factors of the user.

* * * * *